(12) United States Patent
Jayathirtha et al.

(10) Patent No.: US 10,417,919 B1
(45) Date of Patent: Sep. 17, 2019

(54) SYSTEMS AND METHODS FOR OPTIMIZING LANDING PERFORMANCE

(71) Applicant: HONEYWELL INTERNATIONAL INC., Morris Plains, NJ (US)

(72) Inventors: Srihari Jayathirtha, Karnataka (IN); Kalimulla Khan, Karnataka (IN); Sripathi Ramachandra, Karnataka (IN); Chavdar Kirov, Sofia (BG); Dinkar Mylaraswamy, Fridley, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/137,010

(22) Filed: Sep. 20, 2018

(51) Int. Cl.
| B64C 25/42 | (2006.01) |
| G08G 5/02 | (2006.01) |
| G05D 1/00 | (2006.01) |
| G08G 5/00 | (2006.01) |
| B64D 45/04 | (2006.01) |
| B60T 8/17 | (2006.01) |

(52) U.S. Cl.
CPC ............ G08G 5/02 (2013.01); B64C 25/426 (2013.01); B64D 45/04 (2013.01); G05D 1/0083 (2013.01); G08G 5/0013 (2013.01); B60T 8/1703 (2013.01); B64C 25/42 (2013.01)

(58) Field of Classification Search
CPC ...... G08G 5/02; G08G 5/0013; G05D 1/0083; B64C 25/426; B64C 25/42; B64D 45/04; B60T 8/1703
USPC ............. 701/16, 70; 340/947, 951, 971, 972
See application file for complete search history.

(56) References Cited

U.S. PATENT DOCUMENTS

| 5,052,638 A | * | 10/1991 | Minovitch | ............ | B64G 1/405 244/171.1 |
| 7,586,422 B2 | | 9/2009 | Goodman et al. | | |
| 7,818,100 B2 | | 10/2010 | Goodman et al. | | |

(Continued)

OTHER PUBLICATIONS

The DC converter control for deceleration profile in energy recovery from landing aircraft; Shamsul Aizam Zulkifli ; Md Zarafi Ahmad; Erwan Sulaiman; 2012 7th IEEE Conference on Industrial Electronics and Applications (ICIEA); year: 2012; pp. 291-296.*

(Continued)

*Primary Examiner* — Cuong H Nguyen
(74) *Attorney, Agent, or Firm* — Lorenz & Kopf, LLP (57) ABSTRACT

Systems and methods that optimize landing performance are provided. The system determines a number, N, of equipment configurations (a combination of a brake setting and a thrust reverser configuration) supported by the aircraft. The system determines a deceleration airspeed to achieve a target taxi speed and, for each of the N equipment configurations, determines a respective deceleration distance. In various embodiments, the system further updates the deceleration distances by one or more of a brake's condition, aircraft historical data, brake warranty and life cycle data, and environmental conditions. The deceleration distances are used to identify a number P of exit-ways that can be used at the runway. Total costs (including brake usage and fuel cost) for each of the P exit-ways is determined, and the equipment configuration that delivers the lowest total cost delivers the optimize landing performance.

20 Claims, 4 Drawing Sheets

(56) References Cited

U.S. PATENT DOCUMENTS

| | | | | |
|---|---|---|---|---|
| 7,980,058 | B2* | 7/2011 | Chang | F02C 3/04 |
| | | | | 60/228 |
| 8,346,455 | B2* | 1/2013 | Rado | B60T 8/1703 |
| | | | | 244/1 R |
| 8,478,460 | B2 | 7/2013 | Hugues | |
| 8,494,692 | B2 | 7/2013 | Valentova et al. | |
| 8,630,782 | B2* | 1/2014 | Rado | B60T 8/1703 |
| | | | | 244/1 R |
| 8,855,886 | B2* | 10/2014 | Rado | B60T 8/1703 |
| | | | | 244/1 R |
| 9,260,183 | B2* | 2/2016 | Rado | B60T 8/1703 |
| 9,561,860 | B2* | 2/2017 | Knapp | B64C 11/001 |
| 10,040,576 | B1* | 8/2018 | Rosenberg | B64F 1/228 |
| 10,126,756 | B2* | 11/2018 | Boyer | G08G 5/0021 |
| 2006/0243857 | A1 | 11/2006 | Rado | |
| 2007/0132311 | A1 | 6/2007 | Giazotto | |
| 2011/0144875 | A1* | 6/2011 | Rado | B60T 8/1703 |
| | | | | 701/70 |
| 2013/0190999 | A1* | 7/2013 | Rado | B60T 8/1703 |
| | | | | 701/70 |
| 2014/0107872 | A1* | 4/2014 | Rado | B60T 8/1703 |
| | | | | 701/16 |
| 2015/0039200 | A1* | 2/2015 | Rado | B60T 8/1703 |
| | | | | 701/80 |
| 2018/0134400 | A1* | 5/2018 | Knapp | B64C 11/001 |
| 2019/0077520 | A1* | 3/2019 | Rosenberg | B64F 1/228 |

OTHER PUBLICATIONS

A Novel Method of Overrun Risk Measurement and Assessment Using Large Scale QAR Data; Hao Lv ; Jianjun Yu ; Tongyu Zhu; 2018 IEEE Fourth International Conference on Big Data Computing Service and Applications (BigDataService); Year: 2018 pp. 213-220.*

New technology of runway friction coefficient measurement and its towed implementation; V. V. Putov ; A. D. Stotckaia ; V. N. Sheludko; 2016 2nd International Conference on Industrial Engineering, Applications and Manufacturing (ICIEAM); Year: 2016 pp. 1-5.*

Analysis of advanced flight management systems (FMSS), Flight management computer (FMC) field observations trials; Performance based navigation to X landing system (PBN to xLS); Albert Herndon et al.; 2014 IEEE/AIAA 33rd Digital Avionics Systems Conference (DASC); Year: 2014, pp. 2D2-1-2D2-19.*

* cited by examiner

SYSTEMS AND METHODS FOR OPTIMIZING LANDING PERFORMANCE

TECHNICAL FIELD

The technical field generally relates to navigational aids, and more particularly relates to identifying an optimized equipment configuration to achieve an optimizing landing performance in an aircraft.

BACKGROUND

Landing performance, from a touchdown point to achievement of a target taxi speed, is affected by many parameters. Some of these parameters include weather, winds, runway length and surface conditions. The aircraft's equipment configuration, such as a combination of one or more of an auto brake setting, spoiler setting, landing flap configuration, and a thrust reverser configuration, can also affect landing performance. An optimal landing performance must balance safe landings with factors that affect cost, such as proper maintenance and usage of the components in the relevant equipment.

With respect to brakes, in some instances, a technical problem occurs in that they degrade more quickly than expected, i.e., they do not support as many landing cycles as they are purported to support. This problem inflates costs unnecessarily. A potential contributor to this problem is that it has been determined that pilots often utilize auto brake settings at levels higher than required. In these scenarios, the required safe landing performance could have been achieved for the given operating conditions with lower brake settings. Therefore, technical problems to address for optimal landing performance include, first, the cost tradeoff between brake usage, thrust reverser configuration, and fuel consumption, and second, a way to provide this navigational assistance to the pilot.

Accordingly, systems and methods for optimizing landing performance are desirable. The desired systems and methods identify an optimized equipment configuration based on a comparison of costs of available equipment configurations and available exit-ways. The desired systems and methods additionally incorporate taxi fuel costs for the taxi on the exit-way. The desired systems and methods process environmental conditions, brake condition, when the last maintenance was performed on the brakes, and a number of landing cycles performed by the brakes since the last maintenance into the cost comparison. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a provided embodiment, a system for optimizing landing performance for an aircraft includes: a source of aircraft systems data, the aircraft systems data including configuration data and performance data for an auto brake system and a thrust reverser system; a source of airport features data; a source of navigation plan data; and a control module configured to process the navigation plan data, aircraft systems data, and airport features data, to: determine a number, N, of equipment configurations supported by the aircraft, an equipment configuration being a combination of a brake setting and a thrust reverser configuration; determine a deceleration airspeed to achieve a target taxi speed; using the deceleration airspeed, for each of the N equipment configurations, determine a respective deceleration distance, thereby generating a first group of N deceleration distances; update each deceleration distance in the first group reflective of a brake's condition, thereby generating a second group of N deceleration distances; update each deceleration distance in the second group reflective of an environmental condition, thereby generating a third group of N deceleration distances; process the third group of N deceleration distances with airport features data to thereby (i) identify a number, P, of exit-ways that can be used, and (ii) associate each of the P exit-ways with at least one of the N combinations; for each of the P exit-ways, determine a cost of brake usage for an associated deceleration distance, and a cost of fuel for an associated taxi; identify an optimized equipment configuration as one of the N equipment configurations that is associated with an exit-way of the P exit-ways with the lowest combined cost of brake usage and cost of fuel.

Also provided is method for optimizing landing performance for an aircraft. The method includes: at a control module, receiving aircraft state data and navigation plan data; receiving aircraft systems data including auto brake settings and thrust reverser configurations; processing the aircraft systems data to determine a number, N, of equipment configurations supported by the aircraft, an equipment configuration being a combination of a brake setting and a thrust reverser configuration; determining a respective deceleration airspeed to achieve a target taxi speed; determining, for each of the N equipment configurations, a first group of N deceleration distances associated with the deceleration airspeed; referencing aircraft historical data and updating the first group of N deceleration distances based thereon, thereby generating a second group of N deceleration distances; updating each deceleration distance in the first group reflective of an environmental condition, thereby generating a second group of N deceleration distances; referencing airport features data and processing the second group of N deceleration distances with airport features data to thereby (i) identify a number P of exit-ways that can be used, and (ii) associate each of the P exit-ways with at least one of the N combinations; determining, for each of the P exit-ways, a total cost equal to a cost of brake usage and a cost of fuel; and identifying an optimized equipment configuration as one of the N equipment configurations that is associated with an exit-way of the P exit-ways with the lowest total cost.

In addition, a system for optimizing landing performance for an aircraft is provided. The system includes: a source of aircraft systems data the aircraft systems data including configuration data and performance data for an auto brake system and a thrust reverser system; a source of airport features data; a source of navigation plan data; a source of a surface condition; and a control module configured to process the navigation plan data, aircraft systems data, and airport features data, to: determine a number, N, of equipment configurations supported by the aircraft, an equipment configuration being a combination of a brake setting and a thrust reverser configuration; determine a deceleration airspeed to achieve a target taxi speed; using the deceleration airspeed, for each of the N equipment configurations, determine a respective deceleration distance, thereby generating a first group of N deceleration distances; update each deceleration distance in the first group reflective of the surface condition, to thereby generate updated N deceleration distances; process the updated N deceleration distances with airport features data to thereby (i) identify a number P of exit-ways that can be used, and (ii) associate each of the P exit-ways with at least one of the N combinations; for each of the P exit-ways, determine a total cost equal to a cost of brake usage and a cost of fuel; and identify an optimized equipment configuration as one of the N equipment configurations that is associated with an exit-way of the P exit-ways with the lowest total cost.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

Figure 1:
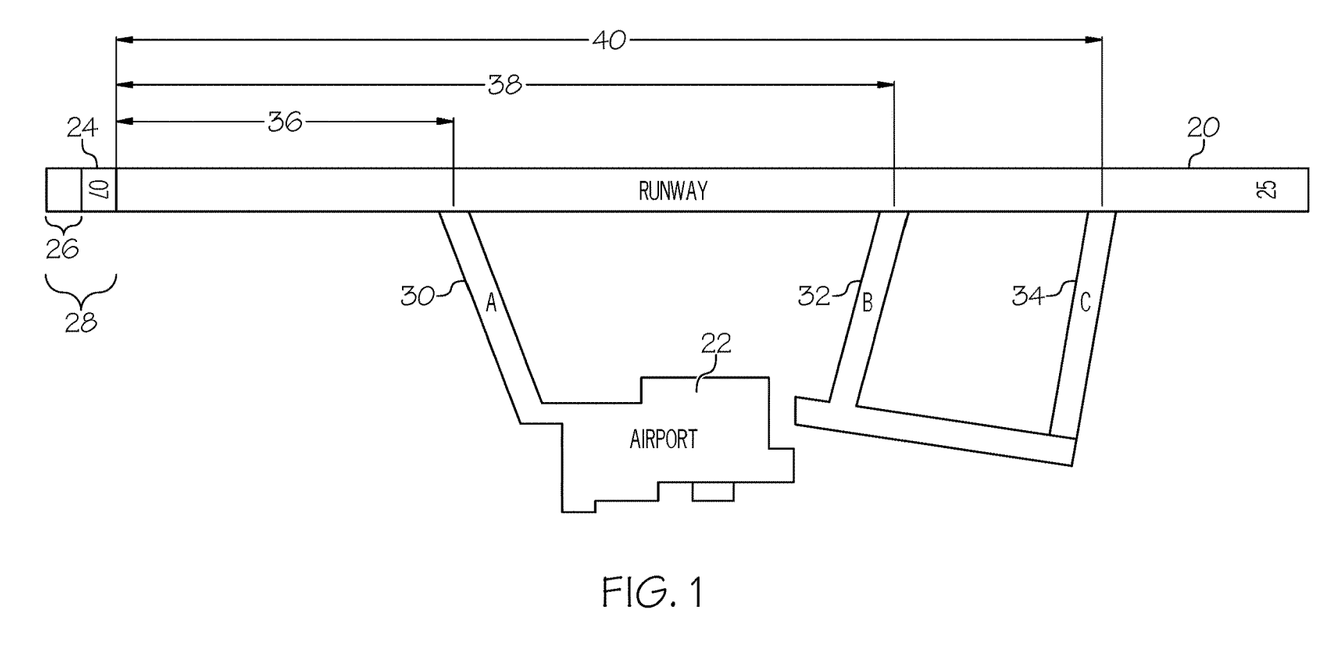
FIG. 1 is a diagram of a runway from which multiple exit-ways may be taken to reach the airport.

An example for discussion of optimizing landing performance is shown in FIG. 1. A designated runway 20 at an airport 22 is depicted. The runway identification (ID) 24 is "07," approached from the left of the page. Landing threshold 26 and touchdown zone 28 are shown. An aircraft generally must decelerate to a target taxi speed before exiting on an exit-way. An aircraft on runway 20 may utilize exit-way A 30, exit-way B 32, or exit-way C 34, to taxi to the airport 22. An aircraft uses a certain amount of distance (the deceleration distance) on the runway to decelerate to the target taxi speed. The deceleration distance is a factor in determining which exit-way to take. The ground distance to exit-way A 30 is distance A 36; the ground distance to exit-way B 32 is distance B 38, which is greater than distance A 30; the ground distance to exit-way C 34 is distance C 40, which is greater than distance B 38.

Regardless of the selected exit-way, pilots often employ brake settings higher than necessary. As may be appreciated, utilizing higher brake settings than necessary accelerates depreciation of the brakes and increases a variety of associated costs.

Exemplary embodiments of a novel disclosed system for optimizing landing performance (FIG. 2, 102) are provided. The disclosed system for optimizing landing performance 102 is directed to the technical problems of over-consumption of brakes and unnecessarily costly landing cycles, due to employing non-optimal equipment configurations. The system for optimizing landing performance identifies an optimized equipment configuration to achieve the optimized landing performance. As used herein, an "equipment configuration" means a given combination of a brake setting and a thrust reverser configuration, and an "optimal" equipment configuration is the lowest cost equipment configuration that will achieve the desired safe landing performance.

Figure 2:
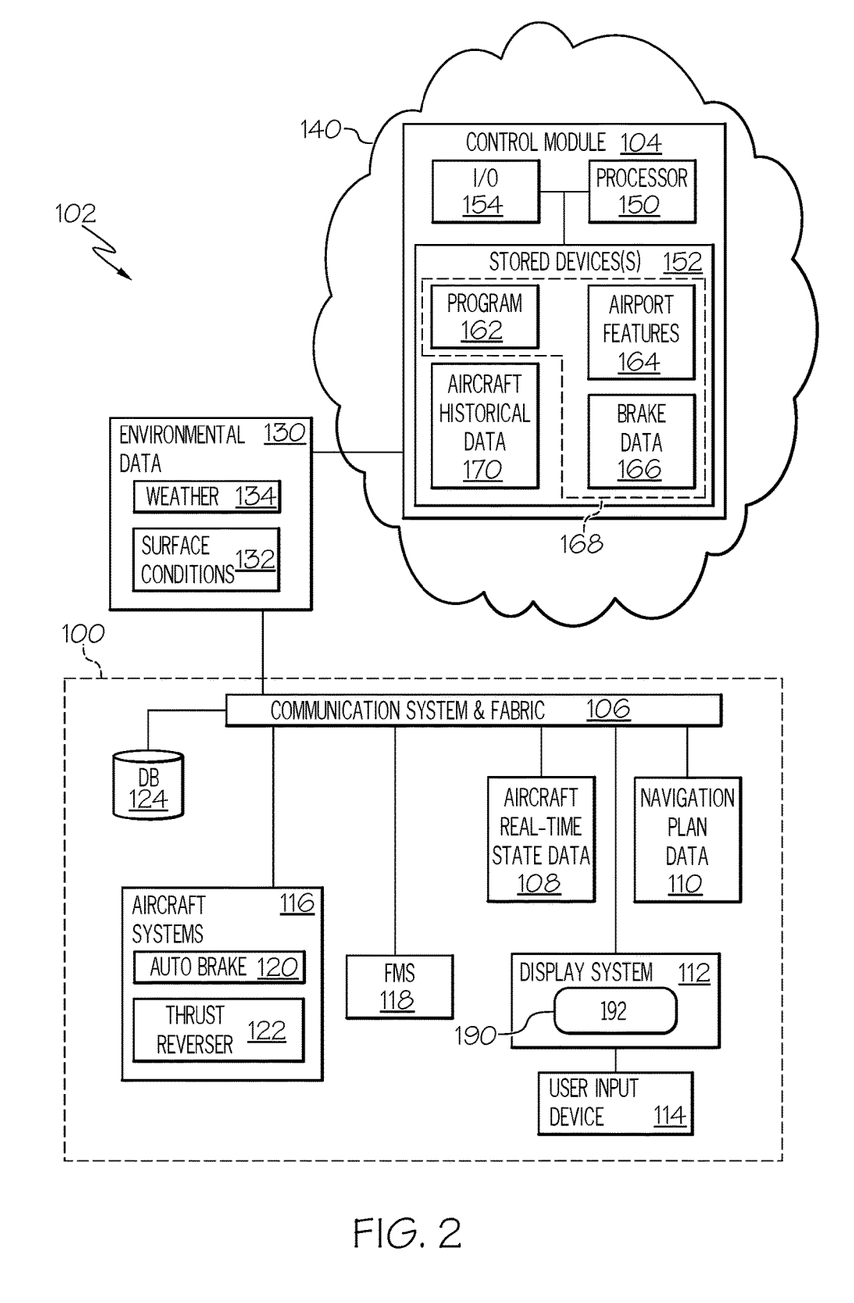
FIG. 2 is a block diagram of a system for optimizing landing performance, in accordance with an exemplary embodiment.

As an overview, the technical solution provided by the disclosed system for optimizing landing performance 102 (also referred to herein as "system" 102) determines a number, N, of combinations of equipment configurations available on an aircraft by processing information provided by an autobrake system and a thrust reverser system. The system 102 references a target taxi speed from the source of navigation plan data, air traffic control, or user input. For each of the N equipment configurations, the system 102 computes a deceleration speed required to achieve the target taxi. The deceleration speed is equal to the touchdown speed minus the target taxi speed. Using the deceleration airspeed, the system 102 determines, for each of the N equipment configurations, a corresponding deceleration distance, which results in N respective deceleration distances. The system then applies novel rules to further process and update the deceleration distances, generating a final N deceleration distances, which may incorporate stored historical and performance data for the aircraft and brakes, and/or may incorporate real-time environmental conditions.

Upon generating the final N deceleration distances, the system 102 processes airport map data associated with the runway 20 to identify a number, P, of exit-ways that can be used based on the final N deceleration distances (therefore, any exit-way that is located prior to the shortest deceleration distance would not be considered). The system 102 again applies novel rules to compute, for each of the P exit-ways, an associated total cost that equals a combined cost of brake usage and cost of fuel. In an embodiment, cost of brake usage is a function of deceleration distance and deceleration time; i.e., a function of duration of brake usage required to decelerate the aircraft to taxi speed at the exit-way.

In an example, the auto brake setting is one of three different levels: 3, 2, and 1. Also in the example, there are two thrust reverser configurations: idle and full. Accordingly, in this example N=6, as there are 3×2=6 equipment configurations. Using the runway 20 and exit-ways shown in FIG. 1, tabular results such as those shown in Table 1 below may be generated. Table 1 shows the N=6 equipment configurations, and that all the exit-ways (A, B, C) shown in FIG. 1 are achievable after determination of the final N deceleration distances. The system 102 has determined that the optimized landing performance, providing the lowest total cost, can be achieved with exit-way B, using an optimized equipment configuration of: an auto brake setting 2 and a thrust reverser full. This is visually distinguished on Table 1 with a boundary that is a bold dashed line. Discussion of other entries in the Table 1 are described in connection with FIG. 2, below.

TABLE 1

| Exit-way | Auto Brake setting | Reverser setting | Brake Usage Cost (USD) | Ground Distance (meters) | Taxi time (mins) | Fuel Required (Kg) | Fuel cost (USD) | Total Cost (USD) |
|---|---|---|---|---|---|---|---|---|
| A | 3 | Idle | 135 | 211 | 4 | 90 | 60.5 | 195.05 |
| A | 3 | Full | 112 | 211 | 4 | 90 | 60.5 | 172.05 |
| B | 2 | Idle | 105 | 403 | 10 | 112 | 74.73 | 179.73 |
| B | 2 | Full | 90 | 403 | 10 | 112 | 74.73 | 64.73 |
| C | 1 | Idle | 101 | 479 | 14 | 148 | 98.7562 | 199.756 |
| C | 1 | Full | 89 | 479 | 14 | 148 | 98.7562 | 187.756 |

Turning now to FIG. 2, in an embodiment, system 102 is generally associated with a mobile platform 100. As used herein, the mobile platform 100 is an aircraft, and is referred to as aircraft 100. The system 102 embodies a control module 104 that may be an independent functional block and may be variously located. In some embodiments, the control module 104 is located external to the aircraft 100, such as in a cloud 140, and communicates wirelessly with systems and components in the aircraft 100, as well as communicating wirelessly with various external sources. In other embodiments, the control module 104 may be integrated within a preexisting mobile platform management system, avionics system, cockpit display system (CDS), flight controls system (FCS), or aircraft flight management system (FMS 118). Optionally, the control module 104 may exist in an electronic flight bag (EFB) that is operationally coupled to the aircraft 100. In embodiments in which the control module is within an EFB, the display system 112 and user input device 114 may also be part of the EFB. Further, in some embodiments, the control module 104 may reside in a portable electronic device (PED) such as a tablet, cellular phone, or the like.

The system 102 references stored data to determine a cost of brake usage and a cost of fuel. The stored data includes airport features 164 data, brake data 166, and aircraft historical data 170. The airport features 164 data may include maps and geometries of airport features, like runways, taxiways and exit-ways, their identifications (IDs), lengths, locations and orientations, signage, runway thresholds, touch down points, locations of entries and exits, and the like. The airport features 164 may also include airport status data for the runways and/or taxi paths at the airport; the airport status data indicating operational status and directional information for the taxi paths and exit-ways (or portions thereof). In some embodiments, the airport features 164 are sourced from an Aerodrome Mapping Database (AMDB).

Brake data 166 may include, for a variety of types of brakes, associated operational specifications, maintenance plan requirements, cost, warranty, projected lifecycle, safety margins, and the like. Aircraft historical data 170 includes aircraft-specific data for aircraft systems 116 that has been received from aircraft 100 and stored. Aircraft historical data 170 includes a block of brake status data, for example, a current brake type, a most recent maintenance date and procedure for the brakes, a number of landing cycles that the brakes have been through, a current brake's condition, and the like. The data in aircraft historical data 170 is continually updated and is therefore current.

In various embodiments, the system 102 processes the block of brake status data from aircraft historical data 170 with brake data 166 to determine a brake's condition. To determine a brake's condition, the brake status data is evaluated with respect to the maintenance plan requirements, projected lifecycle, and warranty. In an embodiment, based on this processing, a "brake's condition" may be determined, and in future cycles through the process (method 400, FIG. 4), updated. In an embodiment, the brake's condition is one of heavily used, moderately used, and new; however, many other categories may be used. The current brake's condition is stored in the aircraft historical data 170.

Likewise, aircraft 100 has a certain thrust reverser type. Aircraft 100's thrust reverser may be similarly assessed, categorized, and stored as aircraft historical data 170. Updates to data received from the auto brake system 120 and the thrust reverser system 122 may be further processed with performance data related to their operation in various weather, surface conditions and stopping distances before storing in the aircraft historical data 170.

As mentioned, each of the N deceleration distances may be updated before moving to a next step of identifying exit-ways. In various embodiments, each of the N deceleration distances are updated based on the determined brake's condition. For example, heavily used brakes may result in the deceleration distance being extended. In various embodiments, the system 102 references environmental data 130 and updates each of the N deceleration distances based on the environmental data 130. In some embodiments, the system updates each of the N deceleration distances based on the environmental data 130 and on a brake's condition. Environmental data 130 includes environmental conditions like local weather 134 (such as wind and rain), and surface conditions 132 (such as wet and icy). For example, tail wind and wet surfaces may extend the deceleration distances, but a head wind might shorten the deceleration distance. In an embodiment, the final N deceleration distances, mentioned above, have been updated for environmental conditions. In another embodiment, the final N deceleration distances, mentioned above, have been updated for brake's condition and environmental conditions. In other embodiments, the final N deceleration distances, mentioned above, have been updated for brake's condition.

The final N deceleration distances are used in the selection of the P exit-ways and determination of total costs, as described herein. Total costs include cost of brake usage and fuel costs. The cost of brake usage is a function of aircraft historical data 170 and brake data 166, such as, a brake's condition, a number of landing cycles already performed on the brakes as compared to warranty and operational brake data for the brake type, a duration of brake usage required to decelerate the aircraft to taxi speed in time to use the exit-way, and the like. The cost of brake usage may be revised in accordance with the environmental conditions. The system 102 may update a cost of brake usage in accordance with the brake's condition, for example, by applying a depreciation schedule.

Fuel cost, or cost of fuel, is based on known distance per unit of fuel performance (for example, miles per gallon) and can be further affected by weather and weight of the aircraft 100. Cost of fuel reflects an amount of fuel required to taxi the aircraft at the target taxi speed for a respective taxi distance associated with the exit-way. Accordingly, the system 102 further computes, for each of the P exit-ways, a taxi time and taxi distance for the P exit-way, the fuel required for the taxi, and the fuel cost associated with the taxi on the P exit-way.

With reference back to Table 1, note that exit-way C may have the lowest impact on brakes with a full thrust reverser, as indicated by the lower brake usage cost, but exit-way C has a higher fuel cost (due to the extra taxi distance) making the total cost of that option costlier and therefore not an optimized landing performance.

In various embodiments, the control module 104 and the stored data including the airport features 164, the brake data 166, and the aircraft historical data 170 are all located external to the aircraft 100, such as in the cloud 140, as shown in FIG. 2. In other embodiments, any of: the airport features 164, the brake data 166, and the aircraft historical data 170 may reside in one or more variously located storage devices or databases, such as database (DB) 124.

Regardless of the location of the control module 104, in addition to the airport features 164, the brake data 166, and the aircraft historical data 170, the control module 104 is operatively coupled to any combination of the following aircraft systems: a source of real-time aircraft state data, such as a navigation system 108; a source of navigation plan data, such as a navigation database (NavDB 110); one or more environmental data 130 sources; aircraft systems 116; and, a display system 112. In various embodiments, the control module 104 is additionally operationally coupled to one or more of: a communications system and fabric 106; a user input device 114; and, a flight management system (FMS 118). The functions of these aircraft systems, and their interaction, are described in more detail below.

Real-time aircraft state data may include any of: an instantaneous position (e.g., the latitude, longitude, orientation), a flight path angle, a vertical speed, a ground speed, an instantaneous altitude (or height above ground level), an instantaneous heading of the aircraft 100 (i.e., the direction the aircraft is traveling in relative to some reference), and a current phase of flight. As used herein, "real-time" is interchangeable with current and instantaneous. In some embodiments, the real-time aircraft state data is generated by a navigation system 108. The data provided by the navigation system 108 is referred to as navigation data (also referred to herein as the real-time aircraft state data). The navigation system 108 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS 118, as will be appreciated in the art. The real-time aircraft state data is made available such that the display system 112, the communications system and fabric 106, and the control module 104, may further process and/or handle the aircraft status data.

Navigation plan data may include a prescribed flight plan (FP) and/or a series of intended geospatial midpoints between a departure and an arrival, a target runway, a desired arrival gate, etc., as well as performance data associated with each of the geospatial midpoints (non-limiting examples of the performance data include intended navigation data, such as: intended airspeed, intended altitude, intended acceleration, intended flight path angle, and the like). A source of navigation plan data may be a storage location or a user input device. In various embodiments, the navigation database (NavDB 110) is the source of navigation plan data. The NavDB 110 is a storage location that may also maintain a database of flight plans, and/or information regarding terrain and airports and/or other potential landing locations (or destinations) for the aircraft 100. In operation, the navigation system 108 and the NavDB 110 may be integrated with a FMS 118.

The aircraft system(s) 116 include at least the auto brake system 120 and the thrust reverser system 122 described herein. It is understood that the aircraft system(s) 116 comprise the hardware and software components required to receive commands, adjust configurations responsive to the received commands, and provide real-time performance, status and configuration data in a self-reporting manner. Data from the aircraft system(s) 116 is collectively referred to herein as aircraft systems data, and may include: thrust reverser configuration, thrust reverser performance data, auto brake setting, auto brake performance, auto brake condition, flap configuration, fuel level, temperature control system status, and the like. As may be appreciated, the aircraft system(s) 116 may therefore include a variety of on-board detection sensors and may be operationally coupled to the display system 112 and the FMS 118. The aircraft systems 116 may send aircraft systems data, receive commands, and communicate with other on-board components via the communication system and fabric 106.

In various embodiments, the FMS 118, in cooperation with the navigation system 108 and the NavDB 110, provides real-time flight guidance for aircraft 100. The FMS 118 is configured to compare the instantaneous position and heading of the aircraft 100 with the prescribed flight plan data for the aircraft 100. To this end, in various embodiments, the NavDB 110 supports the FMS 118 in maintaining an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like). In various embodiments, the FMS 118 also supports controller pilot data link communications (CPDLC), such as through an aircraft communication addressing and reporting system (ACARS) router; this feature may be referred to as a communications management unit (CMU) or communications management function (CMF). Accordingly, in various embodiments, the FMS 118 may be a source for the real-time aircraft state data of the aircraft 100.

The display system 112 is configured to continuously receive and process the real-time aircraft status data, prescribed flight plan data, and ILS signals, when present. The display system 112 includes a display device 190 for presenting an image 192. In various embodiments described herein, the display system 112 includes a synthetic vision system (SVS), and the image 192 is a SVS image. In some embodiments, the display system 112 formats and renders information received from the FMS 118, as well as data from external sources, and in particular, the environmental data 130 sources. In other embodiments, the display system 112 may directly receive and process input from an air data heading reference system (AHRS), an inertial reference system (IRS), the navigation system 108, and the environmental data 130 sources. The control module 104 and the display system 112 are cooperatively configured to generate the commands ("display commands") for the display device 190 to render thereon the image 192, comprising various graphical user interface elements, tables, menus, buttons, and pictorial images, as described herein. In exemplary embodiments, the display device 190 is realized on one or more electronic display devices configured as any combination of: a head up display (HUD), an alphanumeric display, a vertical situation display (VSD) and a lateral navigation display (ND). The display device 190 is responsive to display commands from the control module 104 and/or display system 112.

Renderings on the display system 112 may be processed by a graphics system, components of which may be integrated into the display system 112 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. The control module 104 is said to display various images and selectable options described herein. In practice, this may mean that the control module 104 generates display commands, and, responsive to receiving the display commands from the control module 104, the display system 112 displays, renders, or otherwise visually conveys on the display device 190, the graphical images associated with operation of the aircraft 100, and specifically, the graphical images as described herein.

The user input device 114 and the control module 104 are cooperatively configured to allow a user (e.g., a pilot, co-pilot, or crew member) to interact with display devices in the display system 112 and/or other elements of the system 102, as described in greater detail below. Depending on the embodiment, the user input device 114 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 114 is configured as a touchpad or touchscreen, it may be integrated with the display system 112. As used herein, the user input device 114 may be used to for a pilot to accept a runway change or to request a runway change.

In various embodiments, any combination of the FMS 118, user input device 114, and communications system and fabric 106, may be coupled to the display system 112 such that the display system 112 may additionally generate or render, on the display device 190, real-time information associated with respective aircraft systems 116 components. Configured in this manner, the FMS 118 and communications system and fabric 106 provide navigation information to support navigation, flight planning, and other aircraft control functions in a conventional manner, as well as to provide real-time data and/or information regarding the operational status of the aircraft 100 to the control module 104. In some embodiments, the user input device 114, FMS 118, and display system 112 are configured as a control display unit (CDU).

From the perspective of the aircraft 100, communication with external sources, such as the environmental data source(s) 130, and the control module 104, is generally by way of communication system and fabric 106. Environmental data source(s) 130 include: a weather 134 data source and a surface conditions 132 data source, data from which may be provided by a meteorological terminal aviation weather report (METARS), automatic terminal information service (ATIS), datalink ATIS (D-ATIS), automatic surface observing system (ASOS); air traffic control (ATC); and a variety of other radio inputs. With respect to landing, breaking, and taxiing, wind is a particularly relevant weather component, and surface water is a particularly relevant surface component.

The communications system and fabric 106 is configured to support instantaneous (i.e., real time or current) communications between the aircraft 100 and one or more external data source(s). As a functional block, the communications system and fabric 106 represents one or more transmitters, receivers, and the supporting communications hardware and software required for components of the system 102 to communicate as described herein. In various embodiments, the communications system and fabric 106 additional communications not directly relied upon herein, such as bidirectional pilot-to-ATC (air traffic control) communications via a datalink; an automatic dependent surveillance broadcast system (ADS-B); a communication management function (CMF) uplink; a terminal wireless local area network (LAN) unit (TWLU); an instrument landing system (ILS); and, any other suitable radio communication system that supports communications between the aircraft 100 and the various external source(s). In this regard, the communications system and fabric 106 may allow the aircraft 100 to receive information that would otherwise be unavailable to the pilot and/or co-pilot using only the onboard systems.

In various embodiments, the control module 104 is additionally operationally coupled to one or more databases (DB) 124. In addition to the stored data described above, the DB 124 may include one or more of: a runway awareness and advisory system (RAAS) database, and a terrain database, having therein topographical information for the airport and surrounding environment.

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 2, an embodiment of the control module 104 is depicted as a computer system including a processor 150 and one or more storage device(s) 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The one or more storage device(s) 152 may comprise RAM memory, ROM memory, flash memory, registers, one or more databases, a hard disk, or another suitable non-transitory short or long-term storage media capable of storing computer-executable programming instructions or other data for execution. The one or more storage device(s) 152 may be located on and/or co-located on the same computer chip as the processor 150. Generally, the one or more storage device(s) 152 maintain data bits and may be utilized by the processor 150 as storage and/or a scratch pad during operation. Information in the one or more storage device(s) 152 may be organized and/or imported from an external data source during an initialization step of a process; it may also be programmed via a user input device 114. During operation, the processor 150 loads and executes one or more programs, algorithms and rules embodied as instructions and applications contained within the one or more storage device(s) 152 and, as such, controls the general operation of the control module 104 as well as the system 102.

The novel program 162 includes specific instructions and rules which, when executed, cause the control module 104 to perform the functions, techniques, and processing tasks associated with the operation of the system 102. Novel program 162, which includes associated stored variables, may be stored in a functional form on computer readable media, for example, as depicted, in one or more storage device(s) 152. While the depicted exemplary embodiment is described in the context of a fully functioning computer system, those skilled in the art will recognize that the mechanisms of the present disclosure are capable of being distributed as a program product 168. As a program product 168, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 168 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

In executing the process described herein, the processor 150 specifically loads the instructions embodied in the program 162, thereby being programmed with program 162. During execution of program 162, the processor 150 and the one or more storage device(s) 152 form a novel dynamic readouts processing engine that performs the processing activities of the system 102.

In various embodiments, the processor/memory unit of the control module 104 may be communicatively coupled to an input/output (I/O) interface 154. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communications system and fabric 106. The I/O interface 154 may include one or more network interfaces and can be implemented using any suitable method and apparatus. In various embodiments, the I/O interface 154 is configured to support communication from an external system driver and/or another computer system. Also, in various embodiments, the I/O interface 154 may support communication with technicians, and/or one or more storage interfaces for direct connection to storage apparatuses, such as the database 156. In one embodiment, the I/O interface 154 is integrated with the communications system and fabric 106 and obtains data from external data source(s) directly.

Figure 3:
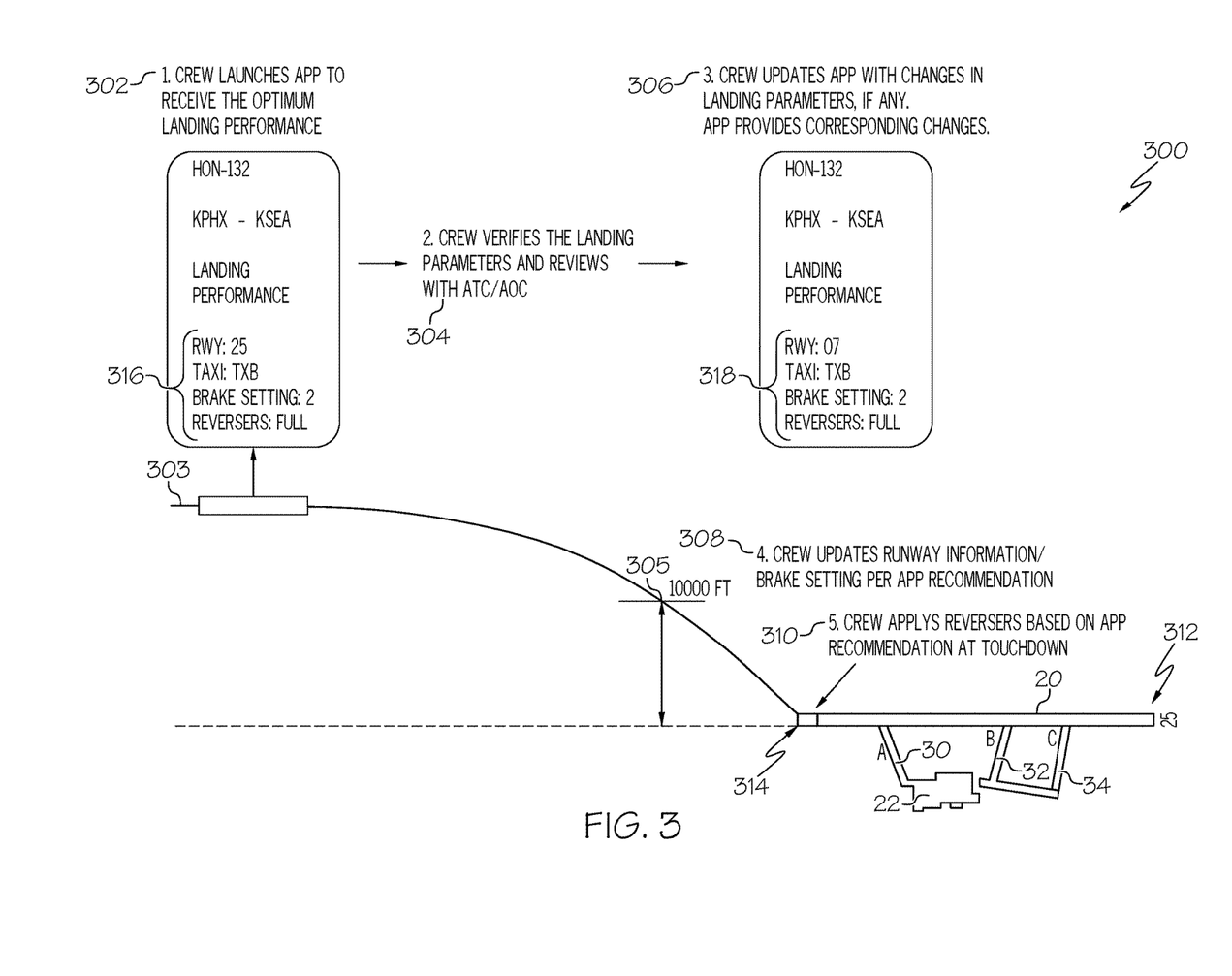
FIG. 3 is an illustration showing an application of the system for optimizing landing performance, in accordance with an exemplary embodiment.

Referring back to FIG. 1 and Table 1, as may be appreciated, in scenarios in which a specific gate or exit-way is required as part of the navigation plan, the system 102 can make the same determinations for the aircraft 100 landing on the runway in an opposite direction, which in practice, is a change of runway identification. This is described in more detail in connection with FIG. 3. FIG. 3 provides a non-limiting example of the system 102 in use during a landing cycle. The image of FIG. 3 is understood to be based on current aircraft state data for the aircraft 100 and to be dynamically modified responsive to continuously obtaining and processing the current aircraft status data. The images 192 may also be continuously updated to reflect real-time changes with respect to terrain, airport features, weather, and neighbor traffic/relevant traffic.

At 302 the crew may launch the system 102. This may be timed with the approach briefing 303. In an alternative, the system 102 is already engaged, and when it detects, based on aircraft state data and navigation plan data, that the aircraft 100 is beginning a descent phase of flight, it automatically launches. In the example, the original navigation plan included landing on runway 25 (312) to take exit-way B 32 ("Taxi TXB" on FIG. 3). After processing the various inputs, the system 102 identifies using runway 07 (314) to exit-way B 32 ("Taxi TXB") as providing the lowest total cost, and therefore the optimal landing performance (note that this is the same runway geometry but utilized from the opposite direction). The brake setting, and the thrust reverser configuration are equal in the before (316) system 102 operation and the revised, after (318) system 102 determination, but 318 provides more deceleration distance for the aircraft 100 before arriving at exit-way B and is understood to have determined this to be a lower cost option, as described above. At 304, the crew verifies the revised parameters and reviews it with ATC. At 306, the crew updates the system 102 as necessary.

At 305, the aircraft 100 begins the descent phase of flight (generally 10,000 feet above ground). At 308, descending toward the approach phase, the crew updates runway information and brake settings per the determination of 318. At 310, (touchdown) the crew applies thrust reverser configurations based on the determinations of 318. Alternately, at 310, the system 102 automatically activates the thrust reverser configuration based on the determinations of 318.

Figure 4:
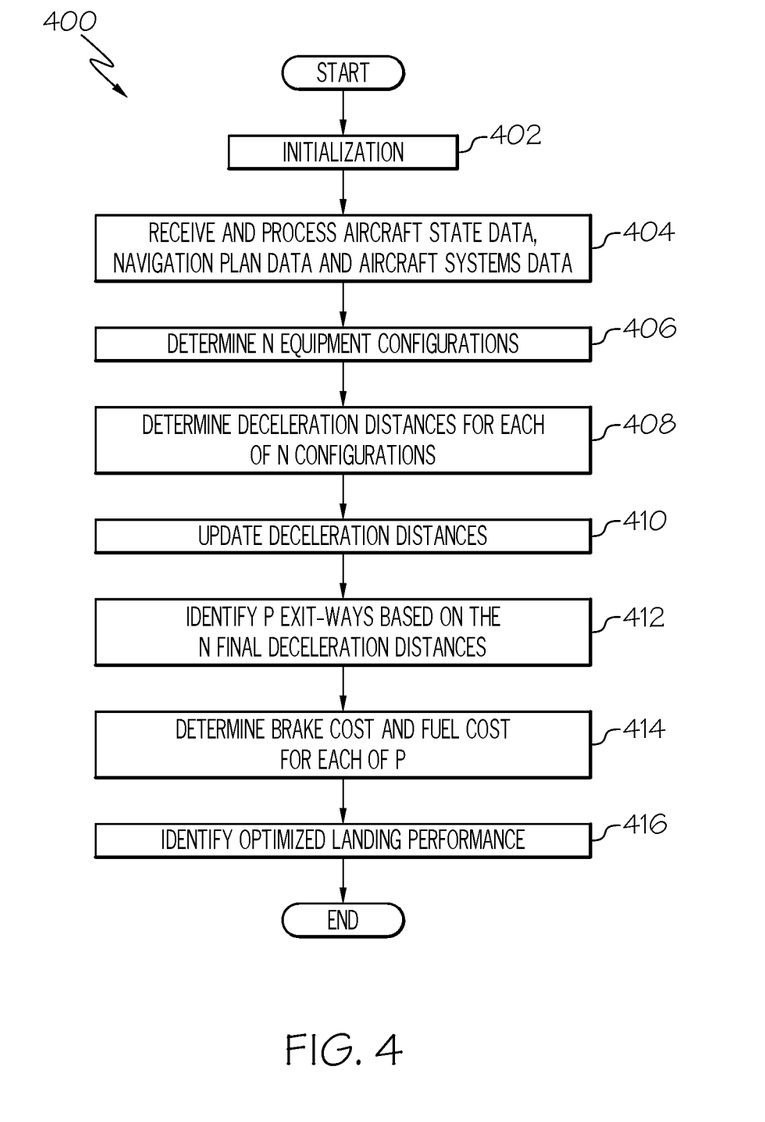
FIG. 4 is a flow chart for a method for optimizing landing performance, in accordance with an exemplary embodiment.

The system 102 may make its determinations and selections in accordance with a method such as method 400 of FIG. 4. With continued reference to FIGS. 1-3, a flow chart is provided for a method 400 for providing a system 102, in accordance with various exemplary embodiments. Method 400 represents various embodiments of a method for selecting an accurate runway record. For illustrative purposes, the following description of method 400 may refer to elements mentioned above in connection with FIG. 2. In practice, portions of method 400 may be performed by different components of the described system. It should be appreciated that method 400 may include any number of additional or alternative tasks, the tasks shown in FIG. 4 need not be performed in the illustrated order, and method 400 may be incorporated into a more comprehensive procedure or method having additional functionality not described in detail herein. Moreover, one or more of the tasks shown in FIG. 4 could be omitted from an embodiment of the method 400 if the intended overall functionality remains intact.

The method starts, and at 402 the control module 104 is initialized and the system 102 is in operation. Initialization may comprise uploading or updating instructions and applications 160, program 162, and various lookup tables stored in the database 156. Stored variables may include, for example, configurable, predetermined amounts of time to use as time-thresholds, parameters for setting up a user interface, and the various shapes, various colors and/or visually distinguishing techniques used for icons and alerts. In some embodiments, program 162 includes additional instructions and rules for rendering information differently based on type of display device in display system 112. Initialization at 402 may also include identifying external sources and/or external signals and the communication protocols to use with each of them. In operation, the aircraft 100 is understood to be continually receiving and processing navigation data and referencing a prescribed flight plan (FP).

At 404, aircraft state data (from navigation system 108), navigation plan data (from NavDB 110), and aircraft systems 116 data are received and processed. At 406, a number, N, of combinations of equipment configurations is determined. In some embodiments, step 406 is triggered at the beginning of the descent phase of flight. In some embodiments, step 406 is responsive to an Approach Briefing. At 408, a deceleration distance is determined for each of the N equipment configurations. At 410, the N deceleration distances are updated in one or more ways. The N deceleration distances may be updated as a function of stored data, such as aircraft historical data 170 and brake data 166. Additionally, the N deceleration distances may be updated as a function of environmental data 130. At the completion of 410, the previously described "final N deceleration distances" are determined. At 412, airport feature data 164 is referenced and processed with the final N deceleration distances to identify P potential exit-ways from the runway 20. At 414, brake cost and fuel cost are determined for each of the P exit-ways. The brake cost and cost of fuel are determined as described above. At 414 these results are presented to the pilot. In an embodiment, the results are presented as a table, such as Table 1. In an embodiment, the results are presented in dialogue boxes. At 416, the optimized landing performance is the lowest cost option and the method identifies the associated optimized equipment configuration for the aircraft 100. After 416, the method 400 may activate the optimized equipment configuration, or may end.

Thus, technologically improved systems and methods optimizing landing performance are provided. As is readily appreciated, the above examples of the system 102 are non-limiting, and many others may be addressed by the control module 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from the set consisting of A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for optimizing landing performance for an aircraft, comprising:
    a source of aircraft systems data, the aircraft systems data including configuration data and performance data for an auto brake system and a thrust reverser system;
    a source of airport features data;
    a source of navigation plan data; and
    a control module configured to process the navigation plan data, aircraft systems data, and airport features data, to:
    determine a number, N, of equipment configurations supported by the aircraft, an equipment configuration being a combination of a brake setting and a thrust reverser configuration;
    determine a deceleration airspeed to achieve a target taxi speed;
    using the deceleration airspeed, for each of the N equipment configurations, determine a respective deceleration distance, thereby generating a first group of N deceleration distances;
    update each deceleration distance in the first group reflective of a brake's condition, thereby generating a second group of N deceleration distances;
    update each deceleration distance in the second group reflective of an environmental condition, thereby generating a third group of N deceleration distances;
    process the third group of N deceleration distances with airport features data to thereby (i) identify a number, P, of exit-ways that can be used, and (ii) associate each of the P exit-ways with at least one of the N combinations;
    for each of the P exit-ways, determine a cost of brake usage for an associated deceleration distance, and a cost of fuel for an associated taxi;
    identify an optimized equipment configuration as one of the N equipment configurations that is associated with an exit-way of the P exit-ways with the lowest combined cost of brake usage and cost of fuel.

2. The system of claim 1, wherein the control module is further configured to activate the optimized equipment configuration.

3. The system of claim 2, wherein the control module is further configured to determine the cost of brake usage as a function of a deceleration distance and a deceleration time during brake usage.

4. The system of claim 3, wherein the control module is further configured to determine the cost of fuel as an amount of fuel required to taxi the aircraft at the target taxi speed for a respective taxi distance associated with the exit-way.

5. The system of claim 4, wherein the control module is further configured to:
    reference brake data and aircraft historical data;
    determine the brake's condition based thereon; and
    update the cost of brake usage in accordance with the brake's condition.

6. The system of claim 5, wherein the aircraft historical data comprises, for the brakes, maintenance cycles and usage patterns, including a number of landings on current brakes.

7. The system of claim 6, wherein the environmental condition comprises at least one of weather and surface conditions.

8. The system of claim 7, wherein the control module is further configured to update the cost of brake usage in accordance with the environmental condition.

9. The system of claim 8, wherein the thrust reverser configuration is either idle or full and the brake setting is one of three levels.

10. A method for optimizing landing performance for an aircraft, comprising:
    at a control module,
    receiving aircraft state data and navigation plan data;
    receiving aircraft systems data including auto brake settings and thrust reverser configurations;
    processing the aircraft systems data to determine a number, N, of equipment configurations supported by the aircraft, an equipment configuration being a combination of a brake setting and a thrust reverser configuration;
    determining a respective deceleration airspeed to achieve a target taxi speed;
    determining, for each of the N equipment configurations, a first group of N deceleration distances associated with the deceleration airspeed;
    referencing aircraft historical data and updating the first group of N deceleration distances based thereon, thereby generating a second group of N deceleration distances;
    updating each deceleration distance in the first group reflective of an environmental condition, thereby generating a second group of N deceleration distances;
    referencing airport features data and processing the second group of N deceleration distances with airport features data to thereby (i) identify a number P of exit-ways that can be used, and (ii) associate each of the P exit-ways with at least one of the N combinations;
    determining, for each of the P exit-ways, a total cost equal to a cost of brake usage and a cost of fuel; and identifying an optimized equipment configuration as one of the N equipment configurations that is associated with an exit-way of the P exit-ways with the lowest total cost.

11. The method of claim 10, further comprising activating the optimized equipment configuration.

12. The method of claim 11, wherein referencing aircraft historical data additionally includes referencing brake data and generating the second group of N deceleration distances is further based on the brake data.

13. The method of claim 12, further comprising determining the cost of brake usage as a function of a deceleration distance and a deceleration time during brake usage.

14. The method of claim 13, further comprising determining the cost of brake usage as a function of a brake's condition.

15. The method of claim 14, further comprising determining the cost of fuel as an amount of fuel required to taxi the aircraft at the target taxi speed for a respective taxi distance associated with the exit-way.

16. The method of claim 15, further comprising determining the brake's condition using the aircraft historical data and brake data.

17. The method of claim 16, wherein the aircraft historical data comprises, for the brakes, maintenance cycles and usage patterns, including a number of landings on current brakes.

18. A system for optimizing landing performance for an aircraft, comprising:
a source of aircraft systems data the aircraft systems data including configuration data and performance data for an auto brake system and a thrust reverser system;
a source of airport features data;
a source of navigation plan data;
a source of a surface condition; and
a control module configured to process the navigation plan data, aircraft systems data, and airport features data, to:
determine a number, N, of equipment configurations supported by the aircraft, an equipment configuration being a combination of a brake setting and a thrust reverser configuration;
determine a deceleration airspeed to achieve a target taxi speed;
using the deceleration airspeed, for each of the N equipment configurations, determine a respective deceleration distance, thereby generating a first group of N deceleration distances;
update each deceleration distance in the first group reflective of the surface condition, to thereby generate updated N deceleration distances;
process the updated N deceleration distances with airport features data to thereby (i) identify a number P of exit-ways that can be used, and (ii) associate each of the P exit-ways with at least one of the N combinations;
for each of the P exit-ways,
determine a total cost equal to a cost of brake usage and a cost of fuel; and
identify an optimized equipment configuration as one of the N equipment configurations that is associated with an exit-way of the P exit-ways with the lowest total cost.

19. The system of claim 18, wherein the control module is further configured to reference aircraft historical data and brake data to determine a brake's condition, and wherein the updated N deceleration distances are further updated in accordance with the brake's condition.

20. The system of claim 19, wherein the control module is further configured to determine the cost of fuel as an amount of fuel required to taxi the aircraft at the target taxi speed for a respective taxi distance associated with the exit-way, and the cost of brake usage as a function of a deceleration distance and a deceleration time during brake usage.

* * * * *